Oct. 21, 1930.                G. B. ASHWORTH                1,779,111
                          LOCOMOTIVE DRIVING BOX
                            Filed June 14, 1928
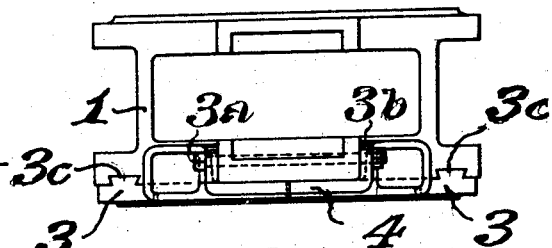
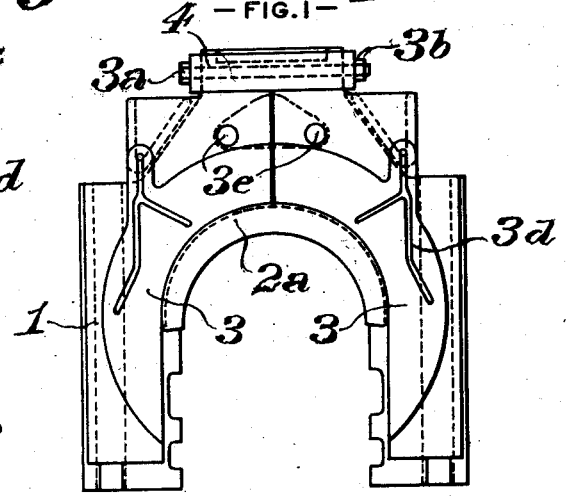
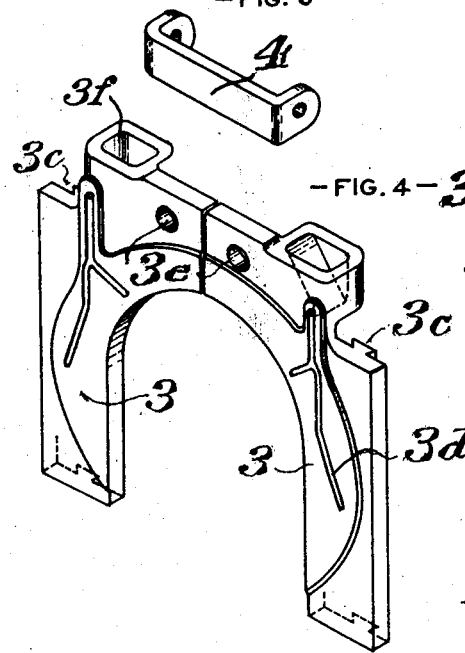
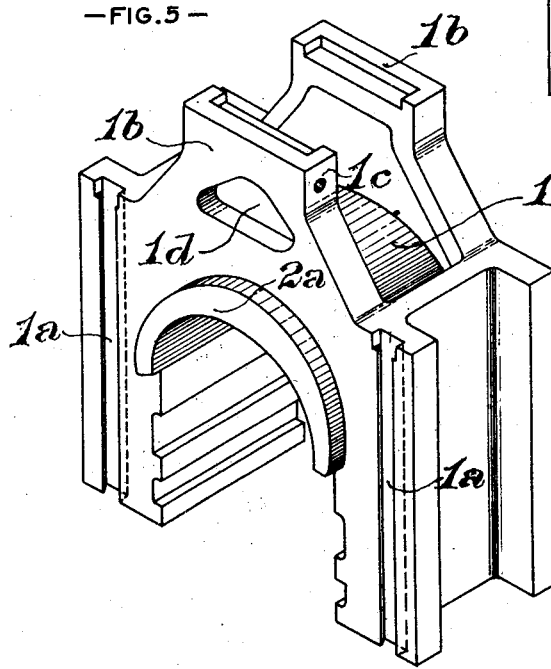
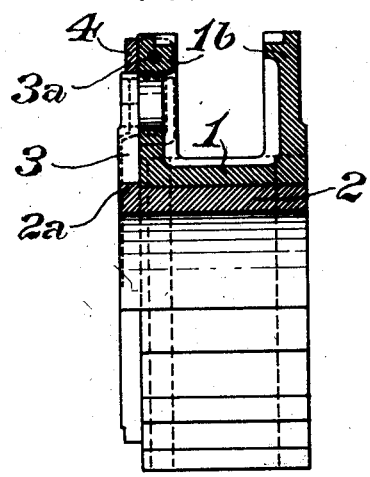

Patented Oct. 21, 1930

1,779,111

UNITED STATES PATENT OFFICE

GEORGE B. ASHWORTH, OF AMSTERDAM, NEW YORK

LOCOMOTIVE DRIVING BOX

Application filed June 14, 1928. Serial No. 285,276.

This invention relates, generally, to the driving boxes of locomotive engines, and particularly to axle boxes of such type as are provided with hub liners for reducing wear of the adjoining faces of driving wheel hubs. The object of the invention is to provide a driving box which will be of increased strength, facility of supporting spring saddles, and capacity of affording effective lubrication to its shoe and wedge faces and to that of the hub of the driving wheel with which it is applied.

The improvement claimed is hereinafter fully set forth.

In the accompanying drawing: Figure 1 is a hub end view, in elevation, of a locomotive driving box, illustrating an embodiment of the invention; Fig. 2, a plan or top view thereof; Fig. 3, a vertical longitudinal central section; Fig. 4, an isometrical view of the hub liner of the driving box; Fig. 5, a similar view of the driving box, with the hub liner detached; and Fig. 6, a similar view of the stirrup.

In the operation of locomotives, the wear of the hub faces of driving boxes, constitutes one of the important elements of maintenance. Inasmuch as such wear is rapidly cumulative, and as its limits are legally restricted, it has long been recognized as desirable, to provide some readily renewable wearing means on the hub faces of driving boxes, to obviate the expense and delay involved in taking a locomotive to the shop, dropping the wheels, and renewing the wearing liners ordinarily attached to the wheel hubs or to the faces of the boxes, or both. The present invention contemplates the application of means whereby the removal and replacement of hub liners may be readily effected, without dropping the wheels and with relatively small diameters of driving wheels.

In the practice of the invention, referring descriptively to the specific embodiment thereof which is herein exemplified, the driving box, 1, is provided with the usual crown brass or bearing, 2, which is pressed in from the hub end of the box. In accordance with the present invention, a segmental flange, $2^a$, is formed at the crown brass, at the end thereof adjoining the wheel hub. Vertical dovetail grooves, $1^a$, are formed in the face of the driving box adjoining the wheel hub, said grooves being disposed on opposite sides of the flange, $2^a$. Upward extensions, $1^b$, extend transversely above the end walls of the driving box, said extensions imparting additional strength to the box by imparting resistance to the internal strains exerted in forcing in the crown brass, and forming a seat for a spring saddle. With this construction it is possible to machine the box for the spring saddle seat and the saddle seat where it fits on the box.

The hub liner is formed in two sections, 3, 3, which abut in the vertical axial plane of the driving box. Each of the sections of the hub liner has formed upon it a dovetail tongue, $3^c$, which engages one of the dovetail grooves, $1^a$, of the driving box. A stirrup, 4, is placed on the top of the sections of the hub liner, and fits against the adjoining extension $1^b$, of the driving box, and a bolt, $3^a$, passes through the stirrup, and through a transverse perforation, $1^c$, in the extension, $1^b$, and is provided with a nut, $3^b$. By this construction, upward movement of the hub liner is prevented. The sections of the hub liner are internally curved, concentrically with the periphery of the crown brass flange, and as herein shown, are fitted and suspended thereon, but they may be otherwise supported, without departure from the spirit of the invention. Lubricant grooves, $3^d$, are formed in the face of the hub liner adjoining the wheel hub, and are in communication at their upper ends with lubricant cups $3^f$. The supply of lubricant at the top of the box 1 may be replenished, when required, through perforations, $3^e$, in the hub liner sections, adapted to register with an opening, $1^d$, in the adjoining upward extension of the driving box.

An additional advantage of the construction of the present invention is the increase in volume of the space for the lubricant applied to the shoe and wedge faces of the box. No partition walls extend across the top of the box, so that the entire space above the crown brass and up to the top of the side walls is available to contain lubricant for the shoe and wedge faces, which wear when lubrication is neglected.

The invention claimed and desired to be secured by Letters Patent is:

The combination of a locomotive driving box, having upward extensions on its end walls and grooves for the engagement of a wear liner in one of said walls; a crown brass, fitted in said driving box and having a segmental flange for the suspension of a wear liner, projecting from one of its ends, between the grooves; a wear liner; a stirrup fitted on the top of said wear liner to prevent the liner from rising; and a connection bolt and nut, attaching the stirrup to one of the upward extensions of the driving box.

GEORGE B. ASHWORTH.